(12) United States Patent  (10) Patent No.: US 7,013,283 B1
Murdock et al.  (45) Date of Patent: Mar. 14, 2006

(54) SYSTEM AND METHOD FOR PROVIDING PROGRAMMING CONTENT IN RESPONSE TO AN AUDIO SIGNAL

(75) Inventors: Michael Chase Murdock, Smithfield, UT (US); John Pearson, Lawrenceville, NJ (US); Paul Sajda, New York, NY (US)

(73) Assignee: Sarnoff Corporation, Princeton, NJ (US)

( * ) Notice: Subject to any disclaimer, the term of this patent is extended or adjusted under 35 U.S.C. 154(b) by 401 days.

(21) Appl. No.: 09/714,838

(22) Filed: Nov. 16, 2000

Related U.S. Application Data

(60) Provisional application No. 60/166,010, filed on Nov. 17, 1999.

(51) Int. Cl.
    *G10L 21/00*  (2006.01)
(52) U.S. Cl. .................. 704/275; 704/270; 704/276; 704/277; 704/278; 386/96
(58) Field of Classification Search ........ 704/270–278; 386/96
    See application file for complete search history.

(56) References Cited

U.S. PATENT DOCUMENTS

| | | | | |
|---|---|---|---|---|
| 5,585,858 A | * | 12/1996 | Harper et al. ................ | 348/485 |
| 5,815,108 A | * | 9/1998 | Terk ............................ | 341/176 |
| 5,835,667 A | * | 11/1998 | Wactlar et al. ............... | 386/96 |
| 5,907,793 A | * | 5/1999 | Reams ........................ | 725/122 |
| 5,983,190 A | * | 11/1999 | Trower et al. ............... | 704/276 |
| 6,192,340 B1 | * | 2/2001 | Abecassis ................... | 704/270 |
| 6,226,794 B1 | * | 5/2001 | Anderson et al. ........... | 725/131 |
| 6,314,398 B1 | * | 11/2001 | Junqua et al. ............... | 704/257 |
| 6,324,512 B1 | * | 11/2001 | Junqua et al. ............... | 704/275 |
| 6,535,854 B1 | * | 3/2003 | Buchner et al. ............. | 704/275 |

FOREIGN PATENT DOCUMENTS

EP          0 782 337 A2      7/1997

* cited by examiner

*Primary Examiner*—David D. Knepper
*Assistant Examiner*—Qi Han
(74) *Attorney, Agent, or Firm*—Lowenstein Sandler

(57) ABSTRACT

A system and a concomitant method for providing programming content in response to an audio signal. The programming content and the audio signal are transmitted in a network having a forward channel and a back channel. In one embodiment, the system comprises a local processing unit and a remote server computer. A first user provides a first audio signal containing a request for programming content from a service provider. The local processing unit receives the first audio signal and transmits the received first audio signal to a service provider via the back channel. The remote server computer receives the first audio signal from the back channel, recognizes the first user and the request for programming content, retrieves the requested programming content from a program database and transmits the programming content to the local processing unit via the forward channel.

23 Claims, 2 Drawing Sheets

SYSTEM AND METHOD FOR PROVIDING PROGRAMMING CONTENT IN RESPONSE TO AN AUDIO SIGNAL

This application claims the benefit of U.S. Provisional Application No. 60/166,010, filed Nov. 17, 1999, which is herein incorporated by reference.

The invention relates generally to a system and a concomitant method for audio processing and, more particularly, to a system and method for providing video content in response to an audio signal.

BACKGROUND OF THE DISCLOSURE

In current television systems, a user may order programming content from a service provider. For example, if a user decides to select and order a pay-per-view cable program, sporting event or some other entertainment package, the user is required to view or select a particular program or package with a remote control. The user would then need to call the service provider to confirm or complete the selection of a program or package.

As calling the service provider is often annoying and possibly time-consuming, e.g., the service provider is busy handling other requests, there is a need for better alternatives or solutions. One solution to this problem is to electronically process a spoken request or command from the user or consumer. Such electronic processing of the spoken command requires accurate and reliable speech recognition, which, in turn, requires a very powerful computer. However, the local implementation of such a powerful computer, e.g., in a cable box, would adversely increase the cost of the providing pay-per-view services with the television systems.

Therefore, a need exists in the art for a system and a concomitant method for economically providing video content in response to a spoken command.

SUMMARY OF THE INVENTION

The present invention is a system and method for providing video content in response to an audio signal such as a spoken audio command. The programming content and the audio signal are transmitted in a network having a forward channel and a back channel. In one embodiment, the system comprises a local processing unit and a remote server computer. A first user provides a first audio signal containing a request for programming content from a service provider. The local processing unit receives the first audio signal and transmits the received first audio signal via the back channel. The remote server computer receives the first audio signal from the back channel, recognizes the first user and the request for programming content, retrieves the requested programming content from a program database and transmits the programming content to the local processing unit via the forward channel.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
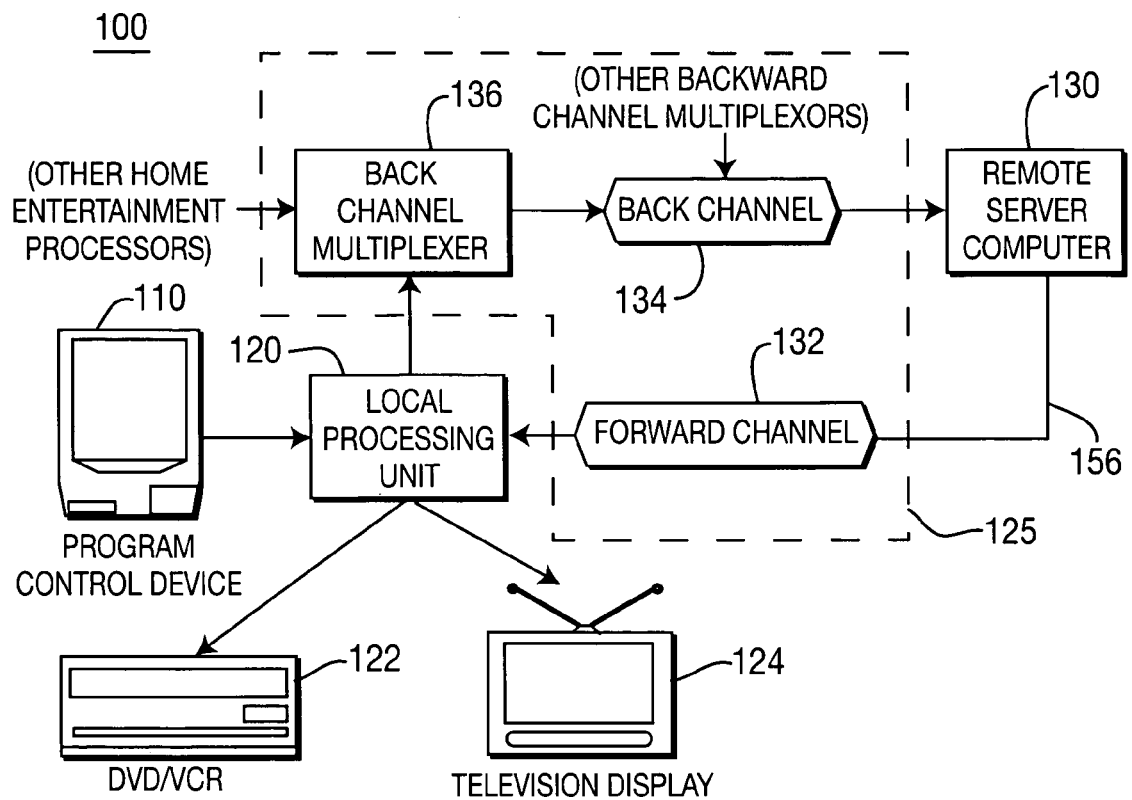
FIG. 1 depicts a high-level block diagram of a voice control system of the present invention.

FIG. 1 depicts a block diagram of the voice activated control system 100 of the present invention. In one embodiment, the voice activated control system 100 comprises a program control device 110, a local processing unit 120 and a remote server computer 130. The local processing unit 120 is coupled to the program control device 110, and is optionally coupled to a video recorder 122 and a television display 124. Additionally, the local processing unit 120 is coupled to the service provider 130 via a television signal delivery network 125 comprising a forward channel 132, a back channel 134 and a back channel multiplexer 136.

The program control device 110 captures the input verbal command signal from the user of the voice activated control system 100. The input command signal may comprise a verbal request of programming content from a service provider. The format of such an input command signal may comprise an audio signal or a video signal (the video imagery can be used for identification of the user). Examples of the requested programming content include web-based content, video-on-demand, cable television programming, and the like. Once the input command signal is received, the program control device 110 performs a transmission, e.g., a wireless transmission, of the command signal to the local processing unit 120.

In one embodiment, the program control device 110 comprises a portable or hand-held controller. However, the program control device 110 may also be physically connected or integrated with the local processing unit 120. As such, the program control device 110 may comprise any device or combination of devices for capturing the input command signal and transmitting the captured signal to the local processing unit 120. The program control device 110 is further described below with respect to FIG. 2.

The local processing unit 120 receives the input command from the program control device 110. Examples of the local processing unit 120 may include a set top terminal, a cable box, and the like. The received input command may comprise an audio signal containing a request by a user for programming content from the service provider. In one embodiment, the local processing unit 120 identifies the user upon receipt of the audio signal. If the user is verified, the local processing unit 120 transmits the audio signal to the back channel multiplexer 136.

The local processing unit 120 may enhance the transmission of the audio signal by providing speech enhancement or filtering background noise in an area proximate to the audio signal. Additionally, if the received input command comprises a video signal, the local processing unit 120 extracts visual information of the user from the video signal and identifies the user from the extracted information, e.g., lip location of the user. The local processing unit 120 also receives the requested programming content from the service provider via the forward channel 132. Upon receipt of the requested programming content, the local processing unit 120 transmits the received content to the video player 122 or the television recorder 124. The local processing unit 120 is further described with respect to FIG. 3.

The back channel multiplexer 136 multiplexes or combines the audio signal transmitted from the local processing unit 120 with additional audio signals from the local processing units of other users, i.e., other users of other voice activated home entertainment systems. The multiplexed audio signal is then transmitted via the back channel 134 to the service provider. The back channel 134 combines the multiplexed audio signal with additional multiplexed audio signals from other back channel multiplexers. As such, the back channel 134 transmits audio control signals from a plurality of local processing units 120 to the remote server computer 130 at the service provider.

The remote server computer 130 performs the functions for the service provider within the voice control system 100. Specifically, the remote server computer 130 receives the multiplexed signal from the back channel 134 and performs speech recognition on the received signal. However, to accurately perform such speech recognition, the remote server computer 130 is generally a very powerful and expensive computer. By centralizing speech recognition of audio commands at the service provider 130, the voice control system 100 may provide accurate speech recognition without the additional cost of providing powerful and expensive computers in each local processing system 120. As the speech recognition is provided at one centralized site, the overall cost of implementing the voice control system 100 is reduced.

The remote server computer 130 performs the speech recognition by identifying or recognizing the user that generated the audio signal and determining the requested programming content contained in the audio signal. Once the user is identified and the requested programming content is determined, the server computer 130 retrieves the requested program content from a program database and transmits the retrieved program content via the forward channel 132 to the local processing unit 120. The remote server computer 130 is further described with respect to FIG. 4. However, in another embodiment of the voice control system 100, separate computers may be used to implement the speech recognition and transmission of programming content functions at the service provider.

Figure 2:
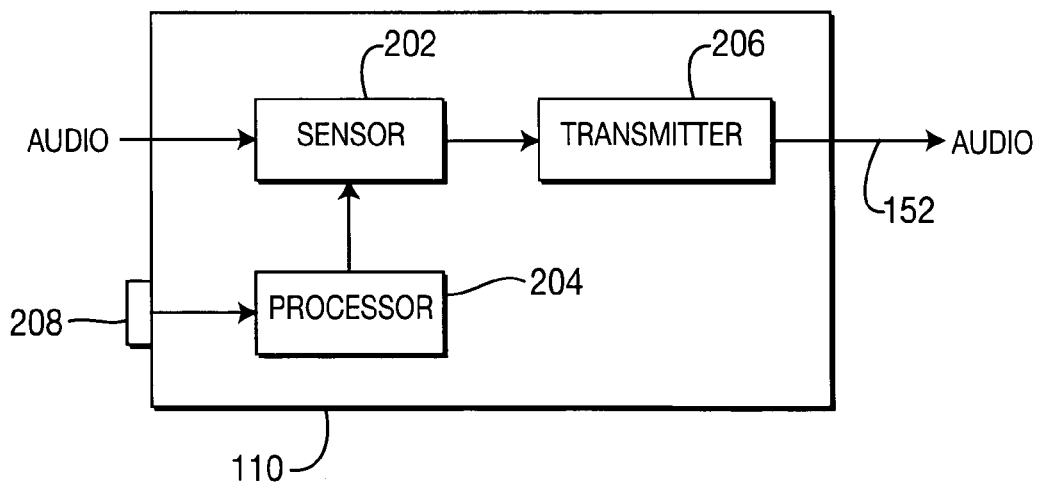
FIG. 2 depicts a block diagram of a program control device of FIG. 1.

FIG. 2 depicts a block diagram of the program control device 110 of FIG. 1. Specifically, the program control device 110 comprises a sensor 202, a processor 204, a transmitter 206 and an optional button 208. A user or viewer may use the program control device 110 to navigate through different programming content selections in a similar manner to current television remote control devices. However, the program control device 110 provides the user with the additional capability of selecting programming content using verbal commands, i.e., selections of programming content in response to an audio signal or audio command. For example, the user may speak the following input command to the program control device 110: "Show me all the college football games on this Saturday." The audio selection or input command is received by sensor 202 and coupled to the transmitter 206.

The sensor 202 comprises a transducer such as a microphone that converts the audio signal from the user into an electrical signal. In one embodiment, the sensor 202 may comprise multiple microphones to accurately focus and capture the input audio signal from the user. In another embodiment, the sensor 202 may comprise a video camera to capture and process a video signal in addition to the audio signal. This video signal can be used for user identification.

Once the input signal is captured at the sensor 202, the transmitter 206 transmits the audio signal and optional video to the local processing unit 120. The transmitter 206 comprises a radio frequency (RF) transmitter to perform wireless transmission of audio signal and video. In one embodiment, the receipt and transmission of the audio signal and video is controlled with the use of the push button 208. For example, the transmission of the audio signal occurs when a user depresses the push button 208. As such, the program control device 110 avoids performing any voice processing when commands are not intended to be processed. The transmitter 206 may also comprise an analog-to-digital converter (ADC) for converting the microphone output into a digital signal.

Figure 3:
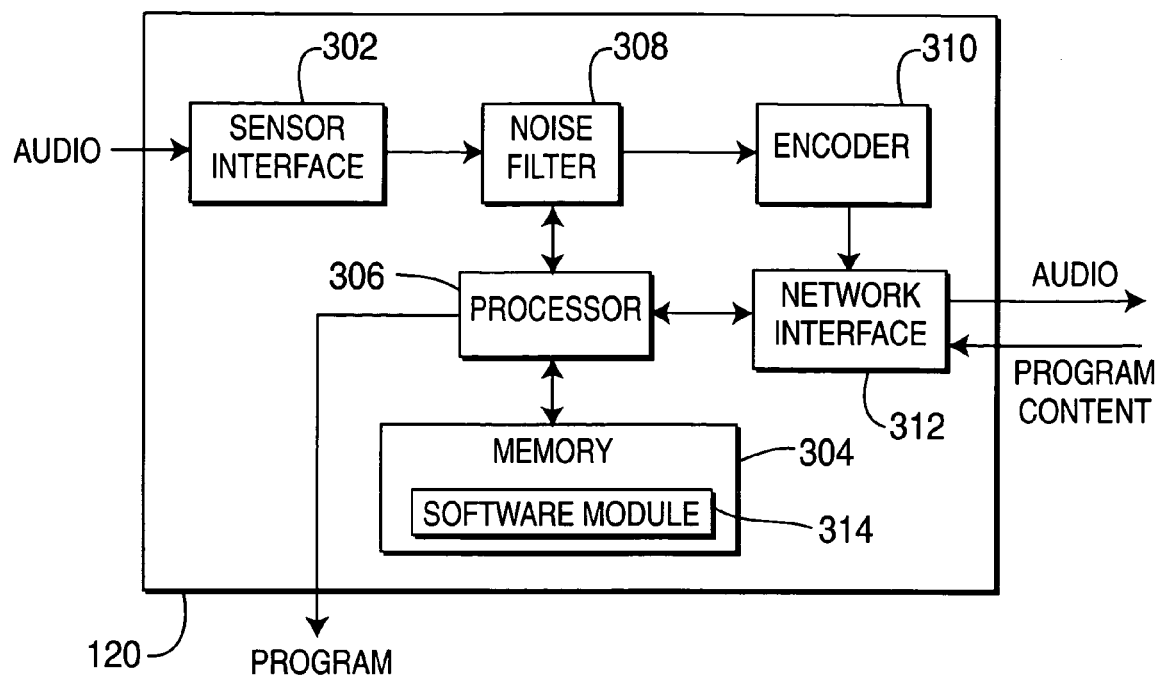
FIG. 3 depicts a block diagram of a local processing unit of FIG. 1.

FIG. 3 depicts a block diagram of a local processing unit 120 of FIG. 1. Examples of the local processing unit 120 may include set top boxes, cable boxes, and the like. More specifically, the local processing unit 120 comprises a sensor interface 302, a memory 304, a processor 306, a noise filter 308, an encoder 310 and a network interface 312. The sensor interface 302 receives the audio signal and (optional) video from the program control device 110. The memory 304 stores programs, e.g., a software module 314, utilized to implement the operation of the local processing unit 120. The software module 314 represents software application programs that, when executed by the processor 306, implement the local processing unit 120 of the voice control system 100.

Once the software module 314 is retrieved from memory 304 and executed, the processor 306 may identify the user from the received audio signal. The processor 306 may also extract visual information of the user as contained in the received video. The extracted visual information, e.g., lip location of the user, enables the local processing unit 120 to perform more accurate speech processing and/or user identification. Additionally, the processor 306 may coordinate the operation of the sensor interface 302, the noise filter 308, the encoder 310 and the network interface 312.

The noise filter 308 filters the effects of background noise on the received audio signal. Background room noise is a primary source of speech recognition inaccuracies. Even a small amount of noise from other speakers or users may cause a large number of speech recognition errors. Additionally, noise in the audio signal may create problems in coding the audio signal for transmission, i.e., selecting an economical code for optimal transmission. To counter the possible effects of background noise, the noise filter 308 performs local speech enhancement on the received audio signal. Specifically, the noise filter 308 implements a local signal separation routine to extract a "clean" audio signal from the received audio signal at the sensor interface 302. An exemplary noise filter 308 is disclosed in U.S. application Ser. No. 09/191,217, filed Nov. 12, 1998 and herein incorporated by reference.

The encoder 310 codes the filtered audio signal for transmission to the service provider via the back channel 134. The network interface 312 converts the encoded audio signal into a format suitable for transmission to the service provider. The network interface 312 also receives the requested programming content from the service provider via the forward channel 132. More specifically, the network interface 312 may couple the audio signal from the encoder 310 to the back channel multiplexer 136, and programming content from the forward channel 132 to the processor 306. Examples of the network interface 312 include cable modems and network interface cards.

Figure 4:
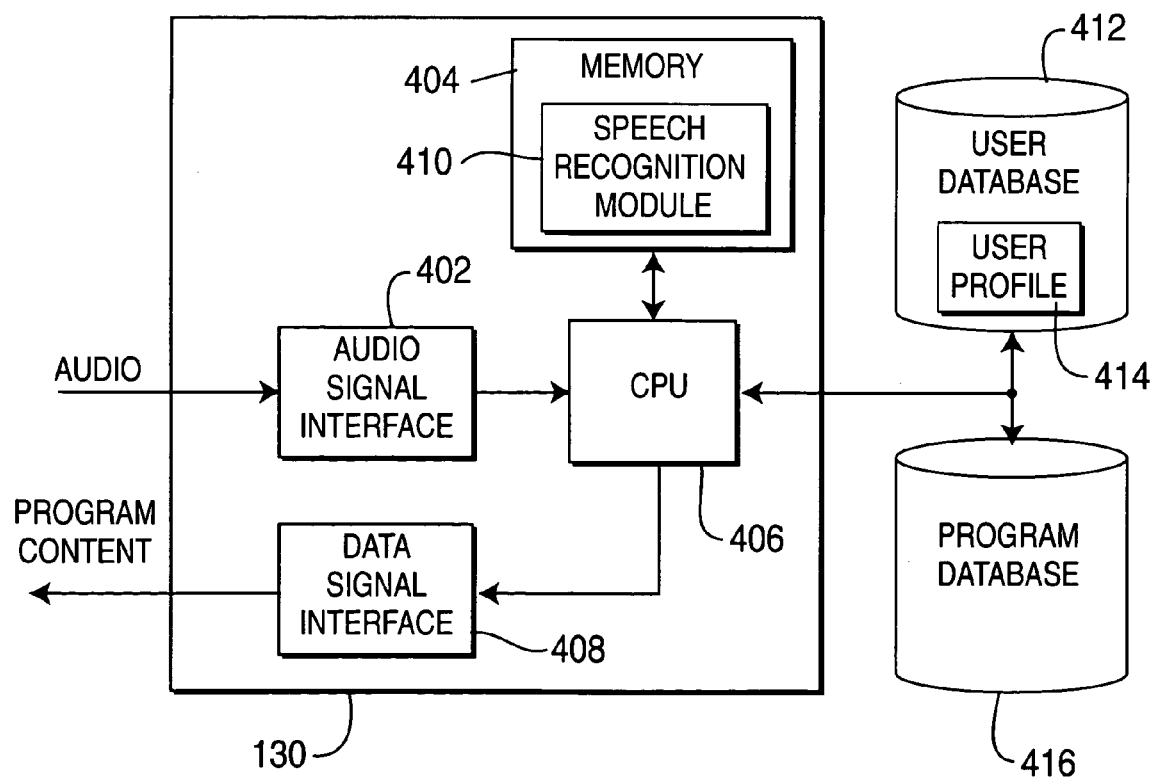
FIG. 4 depicts a block diagram of a remote server computer of FIG. 1.

FIG. 4 depicts a block diagram of one embodiment of the remote server computer 130 at the service provider. Specifically, the remote server computer 130 comprises a command signal interface 402, a memory 404, a central processing unit (CPU) 406, and a data signal interface 408. The command signal interface 402 receives the multiplexed signal from the back channel 134. The memory 404 stores a speech recognition module 410 that, when retrieved and executed by the CPU 406, causes the remote server computer 130 to operate as a speech recognition server. An example of the speech recognition module 404 is the Nuance 7.0™ speech recognition software from Nuance Communications of Menlo Park, Calif.

Once the CPU 406 executes the speech recognition module 410, the remote server computer 130 recognizes the user requesting the programming content and the request from the received signal. In one embodiment, the remote server computer 130 determines whether the user for a particular request matches a user profile 414 in a user database 412. The user profile 414 represents a data structure used by the remote server computer 130 to determine whether a user is entitled to order or request programming content from the service provider. The user profile 414 contains a statistical model of the preferences and audio command patterns of a particular user of the voice control system 100.

Upon recognizing the user and the request for programming content, the CPU 406 determines whether the time is appropriate for retrieving and transmitting the programming content to the local processing unit 120. For example, the CPU 406 would decide to immediately retrieve and transmit video on demand, but wait until a fixed time to retrieve and transmit a pre-scheduled cable television program. The server computer 130 then retrieves the requested programming content from the program database 416. The data interface 408 converts the retrieved programming content into a format suitable for transmission via the forward channel 132 to the local processing unit 120.

Although the server computer 130 is depicted to implement both speech processing and transmission of programming content, the service provider may also use separate computers to implement these functions.

Although various embodiments which incorporate the teachings of the present invention have been shown and described in detail herein, those skilled in the art can readily devise many other varied embodiments that still incorporate these teachings.

What is claimed is:

1. A system for providing programming content in response to an audio signal, where said audio signal and programming content are transmitted using a television network having a forward channel and a back channel, the system comprising:
    a local processing unit for receiving a first audio signal from a first user, where said first audio signal contains a request for said programming content from a service provider, transmitting said first audio signal to the service provider via the back channel of said television network; and
    a remote server computer for receiving said first audio signal from the back channel, recognizing the first user and said request for said programming content from said transmitted audio signal, retrieving the request programming content from a program database, and transmitting said programming content to said local processing unit via the forward channel.

2. The system of claim 1 further comprising:
    a back channel multiplexer for multiplexing said transmitted first audio signal from said local processing unit and a second audio signal from another audio source into a multiplexed signal, and transmitting said multiplexed signal to the back channel.

3. The system of claim 1 wherein said local processing unit identifies the first user prior to transmitting said first audio signal to the service provider.

4. The system of claim 1 wherein said local processing unit comprises:
    a sensor interface for receiving the first audio signal;
    a memory for storing software modules;
    a processor, upon retrieving and executing said software modules from said memory, for verifying whether the first user is entitled to order programming content from the service provider; and
    a network interface for transmitting said first audio signal via said back channel.

5. The system of claim 4 wherein said local processing unit further comprises:
    a filter for filtering background noise from said received first audio signal; and
    an encoder for encoding said filtered audio signal.

6. The system of claim 4 wherein said sensor interface receives a video signal, and said processor extracts visual information of the first user contained in said received video and identifies the first user from said extracted information and said audio signal.

7. The system of claim 1 further comprising:
    a program control device for capturing said first audio signal from the first user, and transmitting said captured first audio signal to said local processing unit.

8. The system of claim 7 wherein said program control device comprises a hand held control device.

9. The system of claim 7 wherein said program control device comprises at least one audio sensor.

10. The system of claim 9 wherein said program control device further comprises a video camera.

11. The system of claim 1 wherein said remote server computer matches the first user from said received first audio signal to a user profile stored in a user database, where said user profile contains audio command patterns and preferences of the first user.

12. The system of claim 1 wherein said remote server computer comprises:
    an audio interface for receiving said first audio signal from said back channel;
    a memory for storing a speech recognition module;
    a processor, upon retrieving and executing said speech recognition module from said memory, for recognizing the first user and said request from said received first audio signal, and retrieving said programming content from the program database; and
    a data interface for transmitting said retrieved programming content to said local processing unit via the forward channel.

13. The system of claim 1 wherein said programming content comprises at least one of web content, video on demand and cable television programming.

14. A method for providing programming content in response to an audio signal, where said audio signal and programming content are transmitted using a television network having a forward channel and a back channel, the method comprising:
    receiving a first audio signal from a first user, where said first audio signal contains a request for said programming content from a service provider;
    transmitting said first audio signal to the service provider via a back channel of a television network;

recognizing the first user and said request for said programming content from said transmitted audio signal;
retrieving the requested programming content from a program database; and
transmitting said retrieved programming content to the first user via a forward channel of said television network.

15. The method of claim 14 further comprising:
multiplexing said first audio signal with a second audio signal, where said second audio signal is transmitted from a different audio source than said first audio signal, into a multiplexed audio signal.

16. The method of claim 14 further comprising:
identifying the first user prior to and transmitting said first audio signal.

17. The method of claim 14 further comprising:
filtering said received first audio signal of background noise upon receipt of said first audio signal from the first user; and
encoding said filtered first audio signal.

18. The method of claim 14 further comprising:
verifying whether the first user is entitled to order programming content from the service provider; and
transmitting said first audio signal to the back channel if the first user is entitled to order programming content.

19. The method of claim 18 wherein said verifying comprises:
identifying the first user from a local list of valid users.

20. The method of claim 14 wherein said recognizing comprises:
matching the first user from the transmitted first audio signal with a user profile containing audio command patterns and preferences of the first user.

21. The method of claim 14 wherein said programming content comprises at least one of web content, video on demand and cable television programming.

22. The method of claim 14 further comprising:
receiving video of the first audio signal from the first user;
extracting visual information of the first user contained in said received video; and
identifying the first user from said extracted visual information and said first audio signal.

23. The method of claim 14 where a first computer performs said recognizing the first user and said request, and a second computer performs said transmitting of said retrieved programming content.

* * * * *